US012491583B2

(12) United States Patent
Müller

(10) Patent No.: US 12,491,583 B2
(45) Date of Patent: Dec. 9, 2025

(54) HAIRPIN WELDING AND INSPECTION FOR QUALITY ASSURANCE

(71) Applicant: II-VI Delaware, Inc., Wilmington, DE (US)

(72) Inventor: Alexander Müller, Ahrensfelde (DE)

(73) Assignee: II-VI DELAWARE, INC., Wilmington, DE (US)

( * ) Notice: Subject to any disclaimer, the term of this patent is extended or adjusted under 35 U.S.C. 154(b) by 683 days.

(21) Appl. No.: 17/811,436

(22) Filed: Jul. 8, 2022

(65) Prior Publication Data
US 2024/0009774 A1   Jan. 11, 2024

(51) Int. Cl.
*B23K 31/12* (2006.01)
*B23K 26/03* (2006.01)
*B23K 26/22* (2006.01)
*B23K 101/38* (2006.01)
*H02K 15/35* (2025.01)

(52) U.S. Cl.
CPC .......... *B23K 31/125* (2013.01); *B23K 26/032* (2013.01); *B23K 26/22* (2013.01); *H02K 15/35* (2025.01); *B23K 2101/38* (2018.08)

(58) Field of Classification Search
CPC .... B23K 31/125; B23K 26/032; B23K 26/22; B23K 2101/38; B23K 26/0096; B23K 26/03; B23K 26/082; B23K 26/0821; B23K 26/38; B23K 26/21; B23K 26/702; B23K 26/062; H02K 15/35
See application file for complete search history.

(56) References Cited

U.S. PATENT DOCUMENTS

| | | | |
|---|---|---|---|
| 2021/0031297 A1* | 2/2021 | Wang | B23K 31/02 |
| 2021/0138586 A1* | 5/2021 | Hofmann | H02K 15/35 |
| 2021/0402518 A1 | 12/2021 | Bocksrocker et al. | |
| 2022/0048137 A1 | 2/2022 | Kallage et al. | |
| 2022/0118548 A1* | 4/2022 | Speker | B23K 31/125 |
| 2022/0126405 A1 | 4/2022 | Maslar | |
| 2022/0134479 A1* | 5/2022 | Ryan | H01R 4/029 219/121.64 |
| 2022/0161361 A1* | 5/2022 | Ryan | B23K 26/21 |
| 2022/0344993 A1* | 10/2022 | Park | H02K 15/0421 |

(Continued)

FOREIGN PATENT DOCUMENTS

| | | | | |
|---|---|---|---|---|
| CN | 112894138 A | * | 6/2021 | ........... B23K 26/044 |
| KR | 20210048390 A | * | 5/2021 | ........... H01S 3/0014 |
| WO | WO-2022124454 A1 | * | 6/2022 | ............. B23K 37/04 |

*Primary Examiner* — Jeffrey T Carley
*Assistant Examiner* — Jose K Abraham
(74) *Attorney, Agent, or Firm* — Blank Rome LLP

(57) ABSTRACT

A method of welding and evaluating welds on stator hairpins includes obtaining first data representative of the ends of a first pair of stator hairpins by capturing image data representative of the ends, and processing the image data to obtain a data set representative of a rectangle which fully encloses the end surfaces of the stator hairpins. After the data set is saved, a laser may be used to form a weld on the end surfaces of the stator hairpins. Then, second data is obtained representative of the weld, and the weld is evaluated by comparing the second data to the data set. A system for welding and evaluating welds on the ends of stator hairpins is also disclosed. A digital camera may be used to capture data, and the laser may be used to form the welds on the stator hairpins.

20 Claims, 3 Drawing Sheets

(56) References Cited

U.S. PATENT DOCUMENTS

2022/0371123 A1\* 11/2022 Mizushima ............ B23K 26/21
2022/0395923 A1\* 12/2022 Hofmann ................ H02K 15/35
2023/0068733 A1\* 3/2023 Bocksrocker .......... B23K 26/22

\* cited by examiner

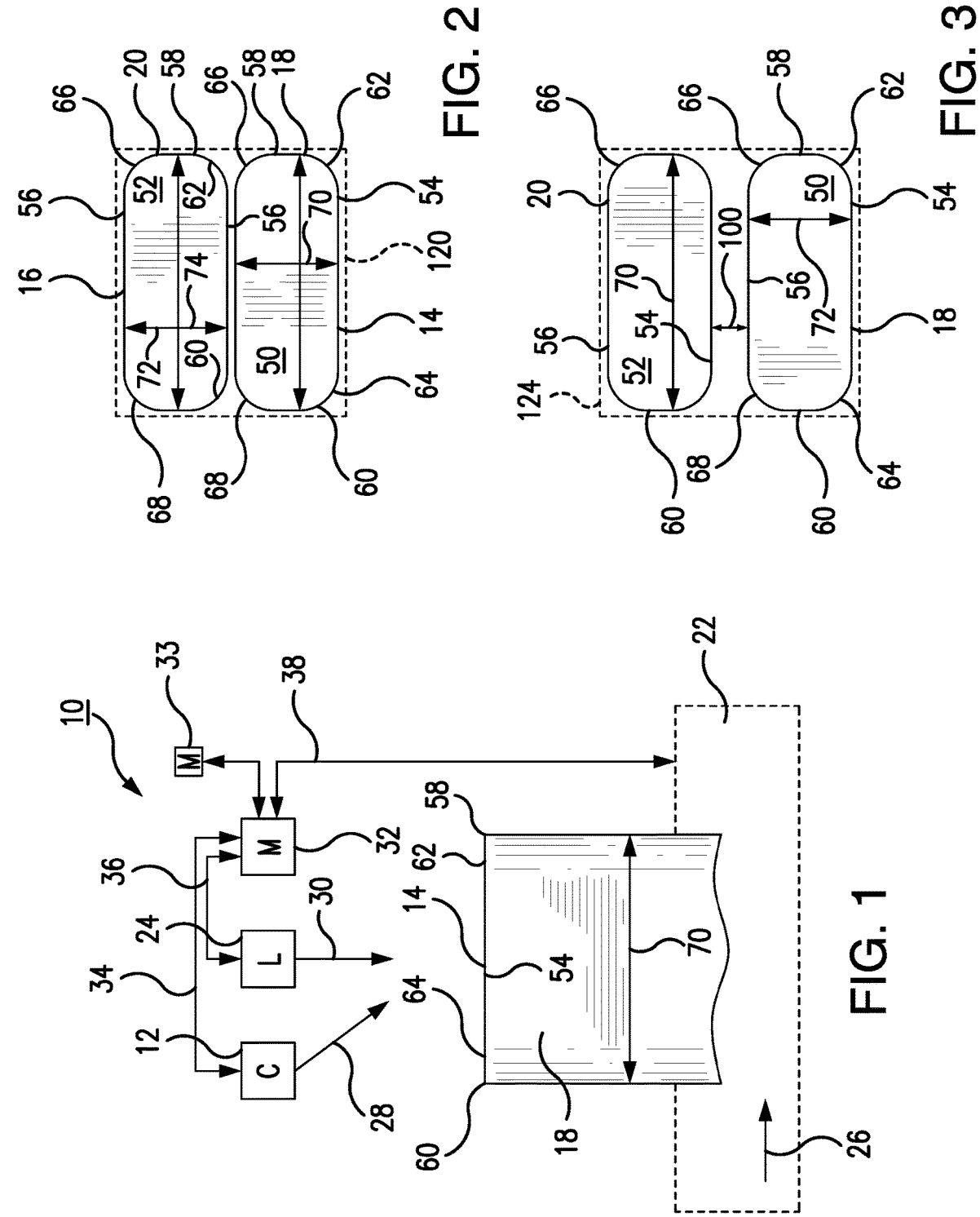

HAIRPIN WELDING AND INSPECTION FOR QUALITY ASSURANCE

BACKGROUND

Electric motors and electric generators are usually made of stators and magnetic rotors. The stators are typically made of electrically conductive windings that exchange energy with the respective rotors. In an electric motor, electric current passes through the windings of a stator to generate a rotating magnetic field that drives a magnetic rotor. In an electric generator, a stator converts the rotating magnetic field of a magnetic rotor into electric current.

A conventional stator may have a continuously wound metal wire winding, where the wire has a circular cross-section. A hairpin stator, on the other hand, may be assembled from bar-shaped segments known as hairpins. Such hairpins, which may be formed of copper, aluminum, or another suitable metal, have a number of advantages. Unlike the conventional wire windings, however, hairpins typically cannot be continuously wound. The ends of the hairpins may be placed next to each other and laser-welded together to form the desired mechanical and electrical connections. A stator for an electric drive motor may require a large number of such end-to-end welds.

Methods of welding the ends of hairpins together to form an electric motor are mentioned in United States Patent Publication No. 2022/0126405 (Maslar), United States Patent Publication No. 2022/0048137 (Kallage et al.), and United States Patent Publication No. 2021/0402518 (Bockrocker et al.). Known methods of welding hairpins together have a number of shortcomings. Among other things, they cannot be performed as effectively, rapidly, and reliably as desired. The present disclosure overcomes the shortcomings of the prior art to a substantial extent.

SUMMARY

The present disclosure relates to a method of forming and evaluating welds for stator hairpins. According to one aspect of the present disclosure, the method includes using a laser to form a weld on the ends of a first pair of hairpins, then obtaining data representative of the weld, and then evaluating the weld by comparing the data representative of the weld to data representative of the ends of the hairpins as the ends were before the weld was formed.

According to another aspect of the present disclosure, the data representative of the ends of the hairpins as they were before the weld was formed correspond to a boundary box, preferably a rectangle, which fully encloses the end surfaces of the hairpins as they were before the weld was formed. If desired, the data representative of the weld may be captured by a digital camera.

The present disclosure also relates to a method which includes the steps of: obtaining first data representative of the ends of a first pair of the stator hairpins by capturing image data representative of the ends of the first pair of hairpins, and processing the image data to obtain a data set representative of a rectangle which fully encloses end surfaces of the first pair of the stator hairpins, and saving the data set; subsequently, using a laser to form a weld on the end surfaces of the first pair of hairpins; subsequently, obtaining second data representative of the weld on the end surfaces of the first pair of hairpins; and evaluating the weld on the end surfaces of the first pair of hairpins by comparing the second data to the first data.

The present disclosure also relates to a system which includes a camera for obtaining image data, a laser for generating a laser beam, and a controller connected to the camera and the laser. In operation, the camera is used to obtain first data representative of the ends of a first pair of the stator hairpins by capturing image data representative of the ends of the first pair of hairpins, and then a data set representative of a rectangle which fully encloses end surfaces of the first pair of hairpins is obtained and saved. The laser is then used to form a weld on the end surfaces of the first pair of hairpins, and then the system obtains second data representative of the weld on the end surfaces of the first pair of hairpins. The weld on the end surfaces of the first pair of hairpins may then be evaluated by comparing the second data to the first data.

BRIEF DESCRIPTION OF THE DRAWINGS

FIG. 1 is a side view of a welding and weld-inspection system, showing a portion of a pair of hairpins before the ends of the hairpins are welded together;

FIG. 2 is an end view of the pair of hairpins of FIG. 1, before the ends of the hairpins are welded together;

FIG. 3 is an end view of another pair of hairpins, like the pair illustrated in FIGS. 1 and 2 but with a greater spacing between the hairpins;

Throughout the drawings, like elements are designated by like reference numerals and other characters. The drawings show non-limiting examples for purposes of illustration and explanation of the present disclosure, and are not drawn to scale.

DETAILED DESCRIPTION

Figure 4:
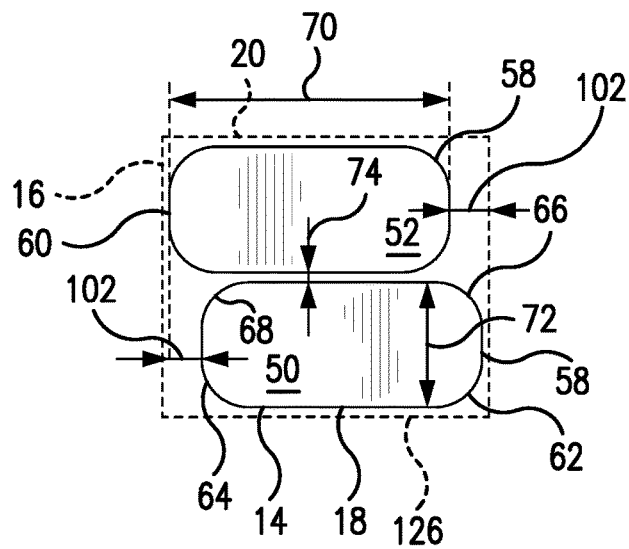
FIG. 4 is an end view of yet another pair of hairpins, like the pair illustrated in FIGS. 1 and 2 but with a lengthwise offset.

Referring now to the drawings, FIG. 1 shows an example of a welding and weld-inspection system 10 constructed in accordance with the present disclosure. The system 10 includes a digital camera (C) 12 for scanning the ends 14, 16 of first and second adjacent hairpins 18, 20. Only one of the hairpins 18 and the corresponding hairpin end 14 can be seen in FIG. 1. The other one of the hairpins 20 and the corresponding hairpin end 16 is hidden from view in FIG. 1 but can be seen in FIG. 2. In the illustrated configuration, the hairpins 18, 20 are located within a stator 22 (FIG. 1). A large number of other hairpins (not illustrated), with respective ends adjacent each other, may also be located in the stator 22.

The welding and weld-inspection system 10 includes a laser (L) 24 for providing energy to form a weld on the ends 14, 16 of the adjacent hairpins 18, 20, and a suitable mechanism (not illustrated) for advancing the stator 22 in an advancing direction 26. The advancing mechanism rotates the stator 22 to locate successive pairs of hairpins (not illustrated except for the hairpins 18, 20) in position to be processed (that is, welded and evaluated for quality assurance) one at a time by the camera 12 and the laser 24.

As described in more detail below, the camera 12 obtains digital image data representing features of the ends 14, 16 of the adjacent hairpins 18, 20. In operation, the camera 12 may capture one or more images of the hairpin ends 14, 16. The digital image data representing the features of the hairpin ends 14, 16 may be obtained from, and may include data from, the one or more captured images. The camera 12 views the hairpin ends 14, 16 in a viewing direction 28, and scans the hairpin ends 14, 16 before and after the ends 14, 16 are welded by a laser beam 30. The laser 24 may be used to generate the laser beam 30. The image data obtained by the camera 12 may be forwarded to a suitable microprocessor or other controller (μ) 32 for image-data processing (described in more detail below).

The controller 32 may have, or be associated with, a computer-readable medium or media (M) 33. The computer-readable medium or media 33 may include suitable software, hardware, or other devices for executing processes within the controller 32, and one or more memory devices for storing data for use within the controller 32. In operation, the camera 12, the laser 24, and the advancement of the stator 22 may be operationally controlled by the controller 32, referring to the computer-readable medium or media 33, through suitable two-way data-communication connections 34, 36, 38.

If desired, the laser 24 may include one or more suitable devices for scanning the laser beam 30 across the ends 14, 16 of the hairpins 18, 20. The laser beam 30 may be deflected, for example, over the hairpin ends 14, 16 by one or more suitable galvanometer scanners (not illustrated). Such deflection scanning for welding may occur while the stator 22 is not rotated. Alternatively, the deflection scanning may occur while the stator 22 is rotated, by coordinating the deflection scanning with movement of the stator 22, using the controller 32 and the connections 36, 38 between the controller 32, the laser 24, and the stator 22. The present disclosure is not limited to the examples shown and described herein.

The present disclosure is not limited to the features shown in the drawings. For example, processes performed by the camera 12 may be performed by a plurality of image-data capturing devices (not illustrated). Likewise, weld formation may be accomplished by more than one laser, or by another suitable device (not illustrated). Instead of controlling the advancement of the stator 22, the controller 32 may be configured to operate the camera 12 and the laser 24 in response to movement of the hairpin ends 14, 16, or according to a suitable timing. The stator 22 may be rotated or otherwise advanced, if desired, by a suitable system (not illustrated) which operates independently of the camera 12, the laser 24, and the controller 32. One or more of the computer-readable medium or media 33 may be physically located in any suitable position or positions, including, but not limited to, within the camera 12 and within the laser 24. Moreover, if desired, plural elements of the system illustrated in FIG. 1 may be used to form and evaluate plural welds simultaneously, or in parallel, in a single stator.

Referring now to FIG. 2, the ends 14, 16 of the hairpins 18, 20 have planar surfaces 50, 52 that are coplanar with each other. Each planar surface 50, 52 has a rectangular periphery with first and second long sides 54, 56, first and second short sides 58, 60, and four rounded corners 62, 64, 66, 68. The distance 70 between the short sides 58, 60 is greater than the distance 72 between the long sides 54, 56, and the distance 72 between the long sides 54, 56 is orthogonal to the distance 70 between the short sides 58, 60.

The four long sides 54, 56 are parallel to each other, the four short sides 58, 60 are parallel to each other, the first short sides 58 are coplanar with each other, the second short sides 60 are coplanar with each other, and there is a small spacing 74 between adjacent second and first long sides 56, 54 of the hairpin end surfaces 50, 52. The present disclosure is not limited, however, to the arrangement illustrated in FIG. 2.

According to the present disclosure, there is a certain amount of tolerable variability in the way in which the hairpins 18, 20 are assembled into the stator 22. For example, the hairpins 18, 20 may be arranged before welding as illustrated in FIG. 3, where there is a greater spacing 100 between the long sides 56, 54 of the hairpin end surfaces 50, 52. The spacing 100 shown in FIG. 3 is greater than the small spacing 74 illustrated in FIG. 2.

Moreover, the hairpins 18, 20 may be arranged before welding as illustrated in FIG. 4, where the short sides 58, 60 are not coplanar with each other, but are offset by an offset amount 102. In the arrangement illustrated in FIG. 4, the short sides 58, 60 are not aligned with each other.

Moreover, the hairpins 18, 20 may be arranged before welding with both the greater end-surface spacing 100 shown in FIG. 3 and the short-side offset amount 102 shown in FIG. 4, and a number of other arrangements and end-surface shapes are also possible. As noted above, the present disclosure is not limited to the examples shown and described herein.

In operation, before the hairpins 18, 20 are welded together, the camera 12 may scan the end surfaces 50, 52 one or more times. The controller 32 processes image data obtained by the camera 12 during the scanning process to define a data set which represents the smallest rectangular boundary box (or template) 120, 124, 126 (FIGS. 2, 3, 4, respectively) which is within the plane of the end surfaces 50, 52, and which fully encloses both of the end surfaces 50, 52. In the illustrated examples, the area of the template 120 determined for the hairpins arrangement illustrated in FIG. 2 is smaller than the areas of the templates 124, 126 determined for the arrangements illustrated in FIGS. 3 and 4, because the arrangement illustrated in FIG. 2 has the small spacing 74 and no offset between the short sides 58, 60 of the end surfaces 50, 52.

In contrast to the arrangements illustrated in FIGS. 3 and 4, the hairpin ends 14, 16 in the arrangement illustrated in FIG. 2 are relatively close to each other and are aligned. The width of the rectangular template 124 determined for the arrangement illustrated in FIG. 3 is greater than the width of the template 120 determined for the arrangement illustrated in FIG. 2 by an amount equal to the greater spacing 100 minus the small spacing 74. The length of the rectangular template 126 determined for the arrangement illustrated in FIG. 4 is greater than the length of the template 120 determined for the arrangement illustrated in FIG. 2 by an amount equal to the offset amount 102.

According to another aspect of the present disclosure, the controller 32 saves the data representing the templates 120, 124, 126 and uses the image data obtained by the camera 12 to determine appropriate alignment, power, and timing settings for the laser beam 30 to form a desired weld on the end surfaces 50, 52. This first image data may be used to determine the location, center, and other circumstances of the end surfaces 50, 52 all of which may be useful in connection with operating the laser beam 30 most effectively to form the desired weld on the end surfaces 50, 52. The controller 32 may then send control signals on line 36 to cause the laser 24 to operate according to the alignment, power, and timing settings. As a result, metal of the hairpin ends 14, 16 is melted to form a weld pool which then cools and solidifies to form a weld, examples of which are designated in FIGS. 5, 6, and 7 by reference numerals 150, 152, and 154, respectively.

Surface tension and heat-flow effects within the respective weld pools cause the welds 150, 152, 154 to have heaped configurations with rounded edges. In operation, the weld pools may flow by gravity laterally over, and downwardly around, peripheral sides 54, 56 of the welded hairpin ends 14, 16. Thus, the centers 156, 158, 160 of the solidified welds 150, 152, 154 may be elevated above the peripheral portions of the welds 150, 152, 154. In the examples illustrated in FIGS. 5 and 7, the welds 150, 154 have peripheral portions which extend laterally outside the corresponding template 120 determined and saved by the controller 32.

After a weld 150, 152, 154 is formed (that is, solidified), the camera 12 captures second image data representing the weld 150, 152, 154, and portions of the end surfaces 50, 52 that are not covered by the weld 150, 152, 154. The camera 12 sends the second image data to the controller 32 via line 34. The controller 32 may then compare the second image data to the template 120 (saved before the weld is formed), and output an evaluation based on the comparison. The evaluation may indicate, for example, that the weld is satisfactory, not satisfactory, or indeterminate (meaning that the weld could be either satisfactory or not, and that further evaluation of the weld may be required).

In operation, the camera 12 may capture one or more images after the weld 150, 152, 154 is formed. The second image data may be obtained from, and may include data from, the one or more images captured after the weld 150, 152, 154 is formed. By deriving the second image data from more than one captured image it may be possible to prevent, or avoid, data corruption caused by fumes, cool-down discoloring of the hairpins, or other effects associated with the welding process.

Moreover, if desired, illumination of the weld 150, 152, 154 may be directionally or otherwise modulated in response to image capturing. For example, after a first image of the weld 150, 152, 154 is captured, the illumination of the weld 150, 152, 154 may be changed (for example, increased, decreased, or provided in a different direction) before a subsequent image of the weld 150, 152, 154 is captured. The manner in which the illumination of the weld 150, 152, 154 is changed for purposes of the subsequent image capturing operation may be responsive to characteristics of the first captured image to improve the overall quality and reliability of the second image data.

Figure 5:
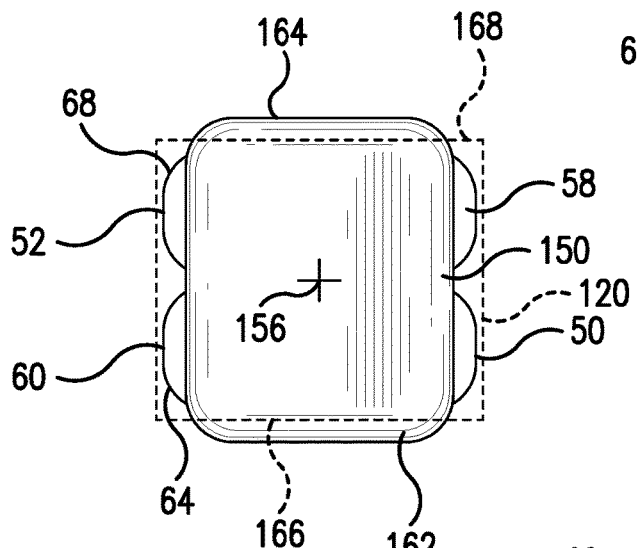
FIG. 5 is an end view of the pair of hairpins illustrated in FIGS. 1 and 2, after the ends of the hairpins are satisfactorily welded together.

In the example illustrated in FIG. 5, peripheral portions 162, 164 of the weld 150 extend beyond opposite sides 166, 168 of the template 120, in two directions away from the weld center 156. The controller 32 may be configured to determine that such a symmetrical, well-developed weld 150 should be determined to be acceptable. The well-developed weld 150 may have an oval or circular structure whose center 156 may be compared to the center of the previously detected rectangular hairpin structure to further confirm the desired symmetry. The camera 12 and the controller 32 may be able to easily distinguish a rounded weld structure from an unwelded, planar hairpin surface. Among other things, the two surfaces tend to reflect light in different directions.

Figure 6:
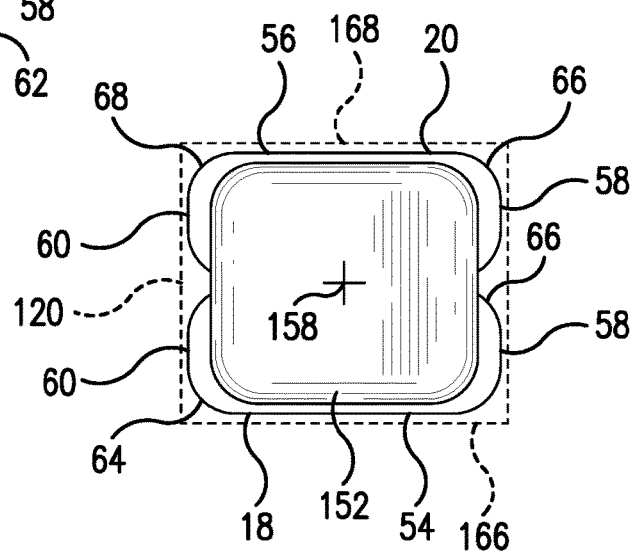
FIG. 6 is an end view of a pair of hairpins, like the pair illustrated in FIGS. 1 and 2, after the formation of a weld that does not have any sufficient overhang.

In the example illustrated in FIG. 6, no portion of the weld 152 extends beyond the opposite sides 166, 168 of the template 120, in directions away from the weld center 158. The controller 32 may be configured to determine that the poorly-developed weld 152, despite its symmetry, should be determined to be unacceptable, causing the system 10 to identify the weld 152 as one which should be repaired or rejected. Where there is no geometric overhang, as in the case illustrated in FIG. 6, it may be presumed that the weld 152 does not provide a sufficient connection.

Figure 7:
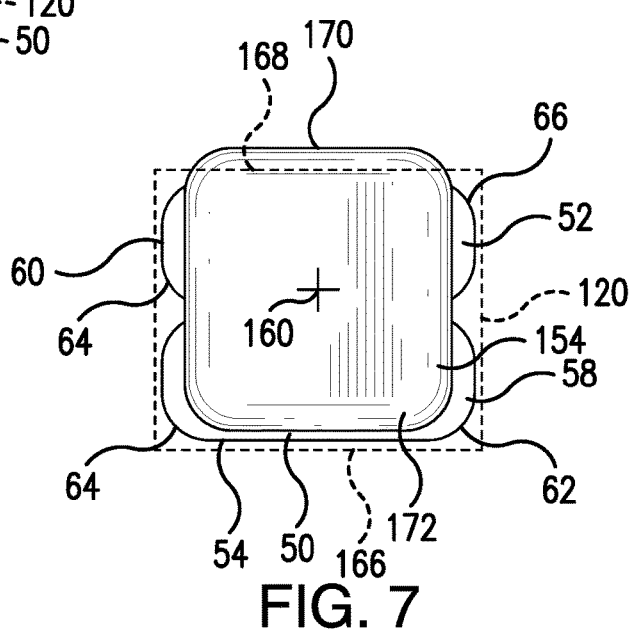
FIG. 7 is an end view of a pair of hairpins, like the pair illustrated in FIGS. 1 and 2, after the formation of a weld that has a one-sided overhang.

In the example illustrated in FIG. 7, one portion 170 of the weld 154 extends beyond a corresponding side 168 of the template 120, in a direction away from the weld center 160, but no portion of the weld 154 extends beyond the opposite side 166 of the template 120, in the opposite direction away from the weld center 160. The controller 32 may be configured to determine that the asymmetrical weld 154 should be considered to be indeterminate, regardless of whether the weld 154 is well developed.

Like the weld 150 shown in FIG. 5, the weld 154 shown in FIG. 7 may have an oval or circular structure whose center 160 may be compared with the center of the previously detected rectangular hairpin structure to confirm that the weld 154 is indeed asymmetrical with respect to the pre-weld end surfaces 50, 52 of the hairpins 18, 20.

The system 10 may identify the weld 154 as one that should be further evaluated before the stator 22 is approved for use in a motor. Where there is a clear, one-sided overhang such as is illustrated in FIG. 7, it may be difficult to reach a conclusion about the connection properties of the weld 154 until some further investigation is conducted.

Figure 8:
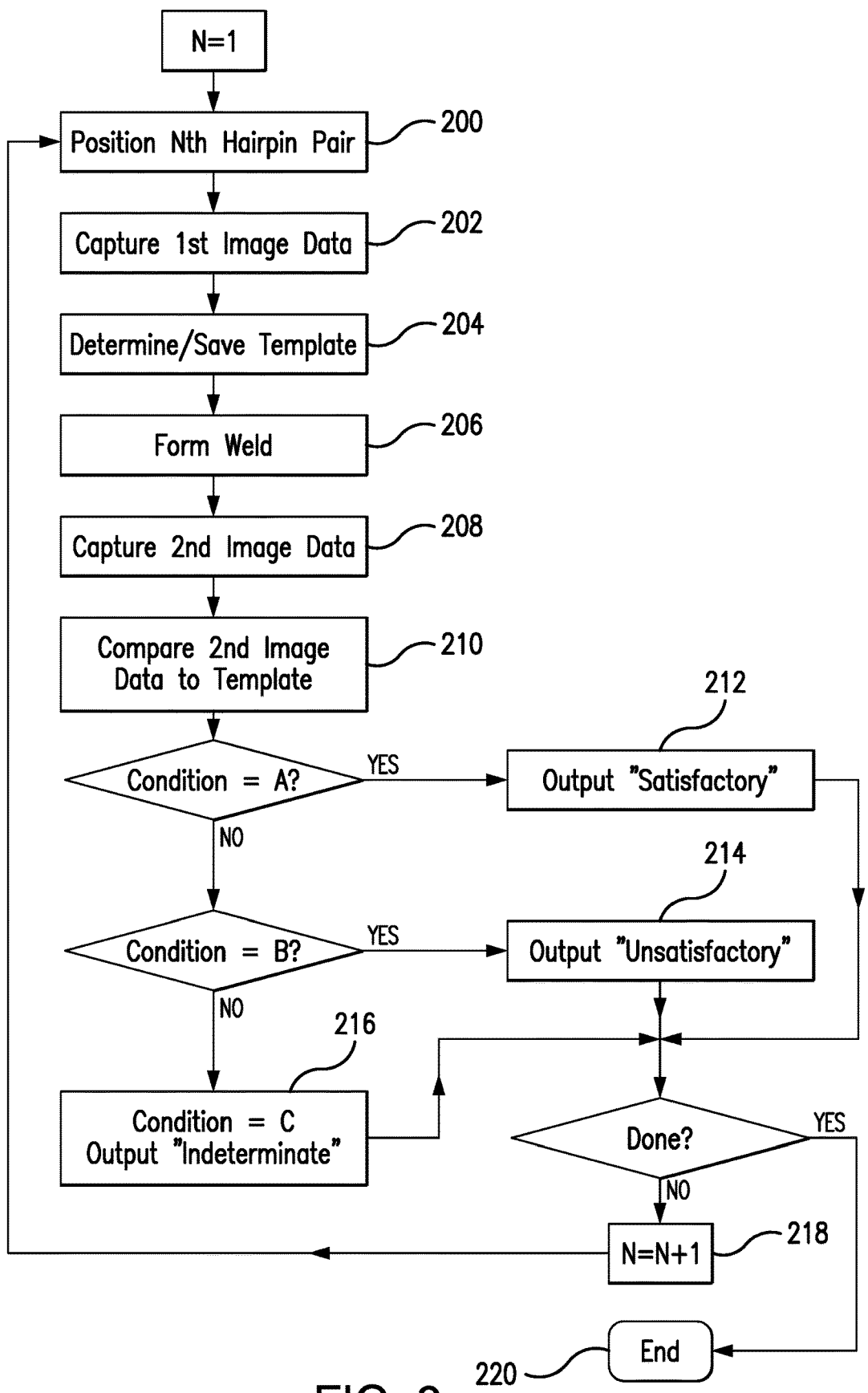
FIG. 8 is a flowchart for a method of operating the welding and weld-inspection system of FIG. 1.

A method of operating the welding and weld-inspection system 10 is illustrated in FIG. 8. At an early stage, the illustrated pair of adjacent hairpins 18, 20 (an example of a first pair of adjacent hairpins) are located proximate to the camera 12 and the laser 24, with the end surfaces 50, 52 of the adjacent hairpins 18, 20 facing the camera 12 and the laser 24 (Step 200). The camera 12 then captures image data (examples of first image data) representative of the end surfaces 50, 52 and transmits the image data to the controller 32 (Step 202). As illustrated in FIG. 8, the first image data is captured before the hairpin ends 14, 16 are welded together.

The controller 32 saves and processes the image data to determine a data set which represents the smallest rectangular template 120 (FIG. 2) which fully encloses both of the end surfaces 50, 52 (Step 204). And then the controller 32 uses the image data to operate the laser 24 with suitable alignment, power, and duration, such that one of the welds 150, 152, 154 illustrated in FIGS. 5, 6, and 7 is formed on the ends 14, 16 of the hairpins 18, 20 (Step 206). As illustrated in FIG. 8, the welding step 206 occurs after the step 202 of capturing the first image data.

The camera 12 then captures second image data representative of the solidified weld 150, 152, 154 and any portions of the end surfaces 50, 52 not obscured by the weld 150, 152, 154, and transmits the second image data to the controller 32 (Step 208). In the illustrated example, the step 208 of capturing the second image data occurs after the weld is formed. As noted above, the second image data may be obtained from, and may include data from, one or more images captured by the camera 12 after the formation of the weld 150, 152, 154. The controller 32 then compares the second image data to the saved data set representing the template 120 (Step 210).

If the comparison indicates that the weld 150 is symmetrical and well-developed (a condition identified in FIG. 8 as condition "A"), then the controller 32 outputs an indication that the weld 150 is satisfactory (indicating that the weld 150 may be presumed to provide a satisfactory mechanical and electrical connection between the first pair of hairpins 18, (Step 212).

If the comparison indicates that the weld 152 is not well-developed (as illustrated, for example, in FIG. 6, a condition identified in FIG. 8 as condition "B"), then the controller 32 outputs an indication that the weld 152 is unsatisfactory (indicating that the weld 152 may be presumed to require repair or should be rejected) (Step 214). When too much of the edges of the hairpin ends are exposed (not covered by weld), as in the case illustrated in FIG. 6, electrical arcs (sparks) may undesirably be created when the stator 22 is operated in a motor.

If the comparison indicates that the weld 154 is well-developed but not symmetrical (as illustrated, for example, in FIG. 7, a condition identified in FIG. 8 as condition "C"), then the controller 32 outputs an indication that the condition of the weld 154 is indeterminate (indicating that the weld 154 may require further evaluation) (Step 216).

The stator 22 is then advanced such that a second pair of hairpins (not illustrated) are located in proximity to the camera 12 and the laser 24. The second pair of hairpins are welded and evaluated for quality assurance according to the same process that was performed on the first pair of hairpins 18, 20 (Step 218, followed by Step 200 and subsequent steps illustrated in FIG. 8). The process may then be repeated for third and subsequent pairs of hairpins until all of the hairpins in the stator 22 are welded and evaluated. The process ends when all hairpins in the stator 22 are welded and evaluated (Step 220).

The illustrated process has many advantages. Among other things, welds can be evaluated very rapidly after they are formed, because some of the image-data capture and processing needed to make the evaluations is performed before the welds are formed, and the pre-weld image data capture and processing can also be used to align the laser 24 with the region of interest (ROI) for the system 10, and make other determinations about the location and circumstances of the surfaces 50, 52 before they are welded together.

The present disclosure is not limited to the examples described herein. Except to the extent a feature is recited in the following claims, the present disclosure relates to a variety of systems, devices, and methods in addition to the ones described herein. For example, conditions A, B, and C are not necessarily limited to the conditions illustrated in FIGS. 5-7. Conditions A, B, and C may be used to categorize and distinguish between comparisons of image data for other weld conditions relative to previously captured image data. There may be more or less than three such conditions.

What is claimed as new and desired to be protected by Letters Patent of the United States is:

1. A method of laser welding stator hairpins and of evaluating the laser welding, the method comprising:
   capturing first image data of ends of a pair of the stator hairpins;
   processing the first image data into a template comprising a smallest boundary that fully encloses surfaces of the ends of the pair of the stator hairpins;
   laser welding the ends of the pair of the stator hairpins after capturing the first image data;
   capturing second image data of the ends of the pair of the stator hairpins after the laser welding; and
   evaluating the laser welding of the ends of the pair of stator hairpins, the evaluating comprising:
      comparing the second image data to the template;
      determining that portions of a weld captured in the second image data extend beyond at least two opposite sides of the smallest boundary of the template; and
      categorizing, in response to the determination that the portions of the weld captured in the second image data extend beyond the at least two opposite sides of the smallest boundary of the template, the weld as satisfactory.

2. A method of laser welding stator hairpins and of evaluating the laser welding, the method comprising:
   capturing first image data of ends of a pair of the stator hairpins;
   processing the first image data into a template comprising a smallest boundary that fully encloses surfaces of the ends of the pair of the stator hairpins;
   laser welding the ends of the pair of the stator hairpins after capturing the first image data;
   capturing second image data of the ends of the pair of the stator hairpins after the laser welding; and
   evaluating the laser welding of the ends of the pair of stator hairpins, the evaluating comprising:
      comparing the second image data to the template;
      determining that a weld captured in the second image data is contained entirely within the smallest boundary of the template; and
      categorizing, in response to the determination that the weld captured in the second image data is contained entirely within the smallest boundary of the template, the weld as unsatisfactory.

3. A method of laser welding stator hairpins and of evaluating the laser welding, the method comprising:
   capturing first image data of ends of a pair of the stator hairpins;
   processing the first image data into a template comprising a smallest boundary that fully encloses surfaces of the ends of the pair of the stator hairpins;
   laser welding the ends of the pair of the stator hairpins after capturing the first image data;
   capturing second image data of the ends of the pair of the stator hairpins after the laser welding; and
   evaluating the laser welding of the ends of the pair of stator hairpins, the evaluating comprising:
      comparing the second image data to the template;
      determining that a portion of a weld captured in the second image data overlaps with only one of two opposite sides of the smallest boundary of the template; and
      categorizing, in response to the determination that the portion of a weld captured in the second image data overlaps with only one of two opposite sides of the smallest boundary of the template, the weld as intermediate.

4. A system for welding stator hairpins, the system comprising:
   a camera configured to capture image data;
   a laser configured to generate a laser beam; and
   a controller operatively connected to the camera and the laser, the controller being configured to:
      cause the camera to capture first image data of ends of a pair of the stator hairpins;
      process the first image data into a template comprising a smallest boundary that fully encloses surfaces of the ends of the pair of the stator hairpins;
      cause the laser to weld the ends of the pair of the stator hairpins;

cause the camera to capture second image data of the ends of the pair of the stator hairpins after the laser welds the ends of the pair of the stator hairpins; and evaluate a weld at the ends of the pair of the stator hairpins by comparing the second image data to the template, wherein:

the controller, when the weld captured in the second image data extends beyond at least two opposite sides of the smallest boundary of the template, is further configured to:

determine that the weld captured in the second image data extends beyond at least two opposite sides of the smallest boundary of the template; and categorize the weld as satisfactory based on the determination that the portions of the weld captured in the second image data extends beyond the at least two opposite sides of the smallest boundary of the template.

5. The system of claim 4, wherein the controller, when the weld captured in the second image data is contained entirely within the smallest boundary of the template, is further configured to:

determine that the weld captured in the second image data is contained entirely within the smallest boundary of the template; and categorize the weld as unsatisfactory based on the determination that the weld captured in the second image data is contained entirely within the smallest boundary of the template.

6. The system of claim 4, wherein the controller, when the weld captured in the second image data overlaps with only one of two opposite sides of the smallest boundary of the template, is further configured to:

determine that the weld captured in the second image data overlaps with only one of two opposite sides of the smallest boundary of the template; and categorize the weld as intermediate based on the determination that the weld captured in the second image data overlaps with only one of two opposite sides of the smallest boundary of the template.

7. The system of claim 4, wherein a geometry of the smallest boundary that fully encloses the surfaces of the pair of stator hairpins corresponds to a geometry of the surfaces of the pair of the stator hairpins.

8. The system of claim 4, wherein:

the smallest boundary that fully encloses the surfaces of the pair of stator hairpins is rectangular, and the pair of the stator hairpins have a rectangular cross-section.

9. The system of claim 4, wherein the controller is configured to cause the laser to form a weld on ends of a second pair of the stator hairpins.

10. The system of claim 9, wherein the controller is configured to cause the camera to obtain image data representative of the ends of the second pair of stator hairpins.

11. The method of claim 1, wherein a geometry of the smallest boundary that fully encloses the surfaces of the pair of stator hairpins corresponds to a geometry of the surfaces of the pair of the stator hairpins.

12. The method of claim 1, wherein:

the pair of the stator hairpins is a first pair of the stator hairpins, and the method further comprises laser welding ends of a second pair of the stator hairpins.

13. The method of claim 12, wherein:

the first pair of stator hairpins are spaced apart by a first spacing, and the second pair of the stator hairpins are spaced apart by a second spacing, and the second spacing is greater than the first spacing.

14. The method of claim 12, wherein:

side surfaces of the first pair of the stator hairpins are aligned with each other, and side surfaces of the second pair of the stator hairpins are offset and misaligned from each other.

15. The method of claim 2, wherein a geometry of the smallest boundary that fully encloses the surfaces of the pair of stator hairpins corresponds to a geometry of the surfaces of the pair of the stator hairpins.

16. The method of claim 2, wherein:

the pair of the stator hairpins is a first pair of the stator hairpins, the method further comprises laser welding ends of a second pair of the stator hairpins, the first pair of stator hairpins are spaced apart by a first spacing, and the second pair of the stator hairpins are spaced apart by a second spacing, and the second spacing is greater than the first spacing.

17. The method of claim 2, wherein:

the pair of the stator hairpins is a first pair of the stator hairpins, the method further comprises laser welding ends of a second pair of the stator hairpins, side surfaces of the first pair of the stator hairpins are aligned with each other, and side surfaces of the second pair of the stator hairpins are offset and misaligned from each other.

18. The method of claim 3, wherein a geometry of the smallest boundary that fully encloses the surfaces of the pair of stator hairpins corresponds to a geometry of the surfaces of the pair of the stator hairpins.

19. The method of claim 3, wherein:

the pair of the stator hairpins is a first pair of the stator hairpins, the method further comprises laser welding ends of a second pair of the stator hairpins, the first pair of stator hairpins are spaced apart by a first spacing, and the second pair of the stator hairpins are spaced apart by a second spacing, and the second spacing is greater than the first spacing.

20. The method of claim 3, wherein:

the pair of the stator hairpins is a first pair of the stator hairpins, the method further comprises laser welding ends of a second pair of the stator hairpins, side surfaces of the first pair of the stator hairpins are aligned with each other, and side surfaces of the second pair of the stator hairpins are offset and misaligned from each other.

\* \* \* \* \*